United States Patent
Hansen

(10) Patent No.: US 9,205,457 B2
(45) Date of Patent: Dec. 8, 2015

(54) METHOD OF WORKING A WORK PIECE WITH A COATING OF A LIGNIN-DERIVED SUBSTANCE, WOODEN ELEMENT WITH A COATING OF SUCH LIGNIN-DERIVED SUBSTANCE, AND STRUCTURES, INTERIOR OR EXTERIOR, WITH SUCH WOODEN ELEMENT

(75) Inventor: Leif Hansen, Ornhoj (DK)

(73) Assignee: TOOLING INVEST A/S, Silkeborg (DK)

( * ) Notice: Subject to any disclaimer, the term of this patent is extended or adjusted under 35 U.S.C. 154(b) by 116 days.

(21) Appl. No.: 13/824,213

(22) PCT Filed: Sep. 15, 2011

(86) PCT No.: PCT/EP2011/066016
§ 371 (c)(1),
(2), (4) Date: Apr. 5, 2013

(87) PCT Pub. No.: WO2012/035104
PCT Pub. Date: Mar. 22, 2012

(65) Prior Publication Data
US 2013/0189487 A1   Jul. 25, 2013

(30) Foreign Application Priority Data

Sep. 16, 2010 (EP) .................................... 10177095

(51) Int. Cl.
| | | |
|---|---|---|
| B05D 7/08 | (2006.01) | |
| B27K 3/15 | (2006.01) | |
| B05D 3/02 | (2006.01) | |
| B05D 7/06 | (2006.01) | |
| C09D 197/00 | (2006.01) | |

(Continued)

(52) U.S. Cl.
CPC ................ B05D 7/08 (2013.01); B05D 3/0254 (2013.01); B05D 7/06 (2013.01); B27K 3/15 (2013.01);

(Continued)

(58) Field of Classification Search
None
See application file for complete search history.

(56) References Cited

U.S. PATENT DOCUMENTS 4,070,987 A * 1/1978 Gross et al. .................... 118/257
6,072,015 A * 6/2000 Bolle et al. .................... 527/400

FOREIGN PATENT DOCUMENTS

JP   2005 081640 A      3/2005
JP   2005-081640 A  *   3/2005  ............... B27K 3/15

OTHER PUBLICATIONS

S. Takeshi, F. Masmisu, "Surface Treatment Method of Base Material Comprising Lignocellulosic Material". Mar. 31, 2005, (JP2005-081640 A), [Aug. 27, 2014 Machine Translation of—Detailed Description] <http://www4.ipdl.inpit.go.jp/Tokujitu/PAJdetail.ipdl?N0000=60&N0120=01&N2001=2&N3001=2005-081640>.*

(Continued)

*Primary Examiner* — Timothy Meeks
*Assistant Examiner* — Michael P Rodriguez
(74) *Attorney, Agent, or Firm* — Knobbe, Martens, Olson & Bear, LLP

(57) ABSTRACT

The invention relates to a method of working the surface of an edge or pattern on a work piece made, at least partly, of a wooden material. The method comprising a primary production step of processing the work piece by shaping said edge or pattern on the work piece. The primary production step further comprises applying a coating of phenylpropanoid polymer to said shaped edge or pattern, said coating being a surplus to any phenylpropanoid polymer present in the wooden material before applying the coating, and heating and mechanically working said edge or pattern, resulting in respectively the coating of phenylpropanoid polymer hardening during polymerization and a finished surface of said edge or pattern on the work piece.

9 Claims, 1 Drawing Sheet

(51) Int. Cl.
*C08L 97/00* (2006.01)
*B05D 3/12* (2006.01)

(52) U.S. Cl.
CPC .............. *C09D 197/005* (2013.01); *B05D 3/12* (2013.01); *C08L 97/005* (2013.01); *Y10T 428/24355* (2015.01); *Y10T 428/24769* (2015.01)

(56) References Cited

OTHER PUBLICATIONS

Boerjan et al.; Lignin Biosynthesis; Annu. Rev. Plant Biol. 2003 54:519-46.*

* cited by examiner

METHOD OF WORKING A WORK PIECE WITH A COATING OF A LIGNIN-DERIVED SUBSTANCE, WOODEN ELEMENT WITH A COATING OF SUCH LIGNIN-DERIVED SUBSTANCE, AND STRUCTURES, INTERIOR OR EXTERIOR, WITH SUCH WOODEN ELEMENT

FIELD OF THE INVENTION

The invention relates to a method for working a work piece made, at least partly, of a wooden material. The invention also relates to a wooden element being manufactured by working a wooden material of the wooden element. The invention furthermore relates to furniture, doors, panels, wall elements, ceiling elements or floor elements of buildings or vessels, with such wooden element.

BACKGROUND OF THE INVENTION

Furniture made of wooden elements such as furniture for kitchens, bedrooms and bathrooms are mostly made of wooden elements being painted, being provided with a folio surface or being provided with a veneer surface or a combination of the mentioned different methods of covering surfaces of the wooden element as such.

Wooden elements being panels have surfaces, either a front cover side or a rear cover side or edges. As part of a processing of the wooden element, shaping of edges of the wooden element or patterns on the surface of the wooden element are performed as a primary production step for producing of the wooden element as such. These edges or patterns may because of the processing have a roughness which is too high for painting, folio surface coating or veneer surface coating. Therefore, the wooden elements must be worked at a secondary production step subsequent to the primary production step, but preliminary to painting, folio surface coating or veneer surface coating. Such secondary production step necessitates increased handling and working of the wooden element, but may be needed in order to obtain edges and patterns being smooth enough for painting, folio surface coating or veneer surface coating.

SUMMARY OF THE INVENTION

It is an object of the invention to provide a method of reducing the need for handling edges and patterns of wooden elements, increasing the surface quality of edges and patterns on the wooden elements and possibly increasing the aesthetic final appearance of the wooden element.

This object is obtained by a method comprising the steps of
applying a coating of phenylpropanoid polymer to said shaped edges or pattern, said coating being a surplus to any phenylpropanoid polymer present in the wooden material before applying the coating,
heating and mechanically working said edges or patterns, resulting in respectively the coating of phenylpropanoid polymer hardening during polymerization and a finished worked edge or pattern on the work piece.

A surplus coating of phenylpropanoid polymer such as calcium lignosulphonate on edges and patterns of the wooden element, and subsequent heating, results in a surface roughness being at least a factor two better than the surface quality obtained if no surplus coating is applied.

According to an aspect of the method according to the invention, the wooden material is comprised in one of the following pieces of wooden materials: Low Density Fibreboard (LDF), Medium Density Fibreboard (MDF), High Density Fibreboard (HDF), solid wooden based materials, plant fibreboards, solid plant fibre-based materials. E.g., fibreboards of a certain density exhibit fibres extending from the edges and patterns of the board. Such fibres result in the boards having a certain roughness which may cause difficulties in applying folio coatings or veneer coating, or which may give the edges or patterns on a work piece a non-satisfactory aesthetic appearance. Applying the method according to the invention to edges and patterns of such fibreboards results in a significant increase in the aesthetic appearance of the edges and patterns.

According to an aspect of the method according to the invention,
the step of applying a coating of phenylpropanoid polymer to the pre-worked surface of the wooden material is performed by applying a coating of phenylpropanoid polymer to a pre-finished surface,
the step of working the surface is performed on the pre-finished surface, and said method comprising the further subsequent step of
shaping the pre-finished surface by grinding, milling or other mechanical working of the surface, thereby obtaining a finished shape of the surface.

Different wooden elements may have different shapes along edge surfaces or panel surfaces. The shape of the wooden element may have details of a certain nature and/or the wooden element may have details of a certain small size. If that is the case, it may be difficult to obtain the final shape of the surface after having applied the additional coating and after the additional coating is polymerized. Subsequent mechanical working such as grinding or milling may ensure that a final shape of the surface is obtained. The subsequent working may result in only a fraction of the coated surface, e.g. only some few micrometers, being grinded, milled or by any other mechanical working being abraded from the coating.

According to yet another aspect of the method according to the invention, the step of heating and mechanically working in a single step is performed by at least one roller engaging the surface of the edge or patterns on the wooden material, said rollers having a peripheral speed in relation to the surface, thereby obtaining a frictional heating of the surface. Frictional heating dissipated to the coating is one way of obtaining transfer of thermal energy to the coating of phenylpropanoid polymer. Use of frictional heating may eliminate the use of e.g. electrical heating of the working tool.

According to yet another aspect of the method according to the invention, the step of heating and mechanically working of said shaped edge or pattern, is performed as two separate steps by respectively a heating tool and a working tool. Heating tools conduct or radiate heat to the surface without needing contact with the surface. Heating conducted or radiated to the coating is one way of obtaining transfer of thermal energy to the coating of phenylpropanoid polymer. Use of conduction or radiation heating may eliminate the use of e.g. frictional heating by the working tool. Conduction or radiation heating may be applied by heating sticks or a fan blower or a preheated roller or rail.

In an embodiment of the method according to the invention, both frictional heating and conduction or radiation heating is used for polymerization of the coating of phenylpropanoid polymer. Thus, the advantages of frictional heating and the advantages of conduction or radiation heating are combined. The degree of frictional heating in relation to the degree of conduction or radiation heating may be controlled depending on the wooden material, the coating polymer, the intended surface quality of the wooden material and possible other parameters of the method or of the finished product.

According to still another aspect of the method according to the invention, the step of continuously working said coating of phenylpropanoid polymer for a period of time and/or at a frictional force is performed at a temperature between 60 degrees Celsius and 200 degrees Celsius, preferably at a temperature between 90 degrees Celsius and 120 degrees Celsius. The temperature intervals mentioned ensure a polymerization of the coating of phenylpropanoid polymer being obtained to a certain level of polymerization and being obtained within a certain period of time.

According to yet another aspect of the method according to the invention, the step of end working said coating of phenylpropanoid polymer is performed when the coating of phenylpropanoid polymer has been polymerized, thereby obtaining a surface well suited for final treatment, such as adding a layer of foil or painting.

BRIEF DESCRIPTION OF DRAWINGS

In the following, preferred embodiments of the invention will be described referring to figures, where.

DESCRIPTION OF EMBODIMENTS

Figure 1:
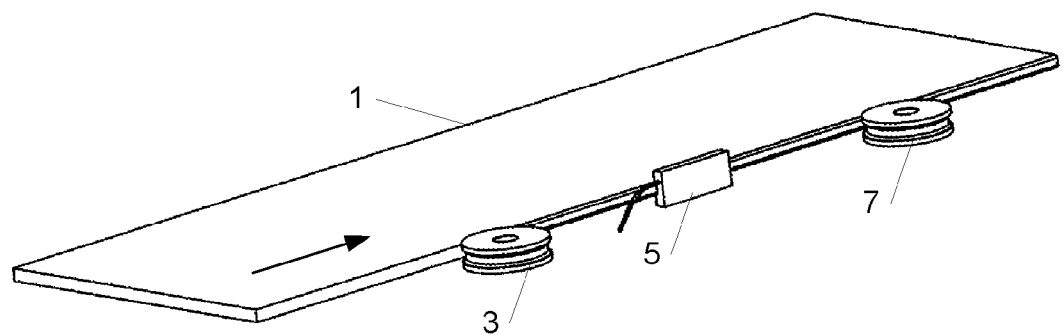
FIG. 1 illustrates an embodiment of the method according to the present invention, where heating and working are integrated.

FIG. 1 illustrates an embodiment according to the present invention where a work piece 1, e.g. an MDF panel having a density of approximately 760 kg per cubic meter, is pre-worked or shaped along an edge surface of the panel by a milling profile 3, thereby resulting in an increased surface roughness, e.g. a surface roughness $R_a$ of approximately 2.5. Next, a coating of calcium lignosulphonate is applied to the edge surface, by an application unit 5. Finally, one or more rollers 7 (e.g. having a surface of technical felt with a hardness of 0.6) are forced against the edge surface, said rollers having a peripheral speed in relation to the edge surface of the MDF panel of approximately 15-20 meters per second. Thereby friction occurs resulting in both heating and mechanically working of the edge, resulting in a finished surface of the edge.

In the example, the rollers are not heated, and only friction heating heats the coated surface. The one or more rollers may, however, be heated to a temperature of e.g. at least 50 degrees Celsius, said temperature being measured by not taking into account any heating incurred due to possible friction. The edge surface is heated and mechanically worked for a period of time and after that, the coating of calcium lignosulphonate is polymerized, and a finished surface of the edge is obtained.

Figure 2:
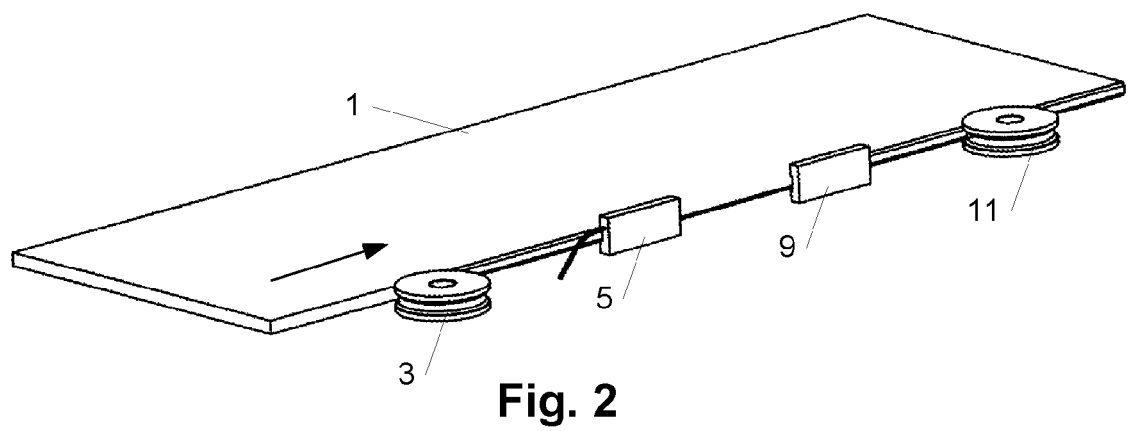
FIG. 2 illustrates an embodiment of the method according to the present invention, where heating and working are separated.

The rollers in the above example could be rollers having a surface of technical felt, but another soft material could also be used. This material could e.g. be rubber FIG. 2 illustrates an alternative to the above described method, where heating and working are performed as separated subsequent steps. After the milling profile 3 and the application unit 5, a heating unit 9 radiating or conducting heat (e.g. a heating stick or a fan heater) is positioned, the heating unit 9 heats the coated surface as a separate step before working the surface of the edge. The working could be performed by a felt roller 7 as explained above.

The average surface roughness $R_a$ of the edge surface having been worked according to the method of the invention and with parameters as mentioned in the example is 0.553. The average surface roughness $R_a$ of an edge surface not having been worked according to the method of the invention and also with parameters as mentioned in the example is 2.652. Thus, a decrease in surface roughness of approximately five times is obtained by the method according to the invention.

If the shape of the finished edge surface is not the intended final shape of the edge surface—during use of a wooden element made from the wooden material—a subsequent mechanical working such as grinding, milling or other mechanical working may be applied to the edge surface for obtaining the final intended shape of the edge surface. Further, if the edge surface is a very complex surface, then a felt roller might not be able to work the edge sufficiently, and also here a subsequent mechanical working such as grinding, milling or other mechanical working may be applied to the edge surface to restore the shaped edge—but only lightly to maintain the finished edge surface.

In the example disclosed, calcium lignosulphonate is used as a coating in addition to any phenylpropanoid polymer or lignin in the wooden material itself. In other applications of the method according to the invention and for other wooden elements and possible furniture obtained by the method according to the invention, other substances than calcium lignosulphonate may be used.

And, in the example disclosed, an MDF panel having a density of 760 kg per cubic-meter is used. In other applications, other wooden materials may be used, such as HDF or LDF of a certain density, or such as solid wooden materials or other plant fibre based materials.

Also, in the example disclosed, an edge surface of the panel is worked. In other applications, the panel surface may additionally or alternatively be worked by the method according to the invention. The method of the invention may be applied to different wooden structures, wooden interior or wooden exterior such as indoor or outdoor furniture, indoor or outdoor doors, panels, wall elements, ceiling elements or floor elements of buildings such as domestic buildings, office buildings or industrial buildings. The method may also be applied to wooden elements of vessels such as wooden interior of a car, a train, a ship, a boat or an aeroplane, or wooden exterior of a vessel such as railings or decks of a ship or a boat.

The invention claimed is:

1. A method for working the surface of an edge or pattern on a work piece made, at least partly, of a wooden material, said method comprising:
   processing the work piece by shaping said edge or pattern on the work piece,
   applying a coating of phenylpropanoid polymer to said shaped edge or pattern, said coating being a surplus to any phenylpropanoid polymer present in the wooden material before applying the coating, and
   heating the shaped edge to which the coating has been applied to a temperature between 60 and 200° C. to ensure polymerization of the coating of phenylpropanoid polymer, and mechanically working said edge or pattern on the work piece, wherein the actions of heating and mechanically working said edge or pattern on the work piece are performed either in a single step or in two separate steps.

2. A method according to claim 1, where the heating and mechanically working of said shaped edge or pattern, are performed as a single step by providing friction between a heating and working tool and the edge or pattern.

3. A method according to claim 2, where the heating and mechanically working in a single step are performed by at least one roller engaging the surface of the edge or patterns on the wooden material, said rollers having a peripheral speed in relation to the surface, thereby obtaining a frictional heating of the surface.

4. A method according to claim 1, where the heating and mechanically working of said shaped edge or pattern are performed as two separate steps, respectively, by a heating tool and a working tool.

5. A method according to claim 1, where the coating of phenylpropanoid polymer applied to said shaped edge or pattern comprises constituents selected from the group consisting of p-hydroxyphenyl, guaiacyl, syringyl and combinations thereof.

6. A method according to claim 5, where the coating of phenylpropanoid polymer applied to said shaped edge or pattern is a substance derived from lignin, and where the substance can be derived from the group consisting of sulphur containing lignin and sulphur free lignin.

7. A method according to claim 6, wherein the sulphur containing lignin is selected from the group consisting of lignosulphonate, calcium lignosulphonate, ammonium lignosulphonate and aluminium lignosulphonate.

8. A method according to claim 1, where the wooden material is comprised of one of the following elements of wooden materials: Low Density Fiberboard (LDF), Medium Density Fiberboard (MDF) or High Density Fiberboard (HDF).

9. The method of claim 7, wherein said lignosulphonate is sodium lignosulphonate.

* * * * *